US008832467B2

(12) United States Patent
Krig

(10) Patent No.: US 8,832,467 B2
(45) Date of Patent: Sep. 9, 2014

(54) DIGITAL RIGHTS MANAGEMENT METAFILE, MANAGEMENT PROTOCOL AND APPLICATIONS THEREOF

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1109 days.

(21) Appl. No.: 12/121,639

(22) Filed: May 15, 2008

(65) Prior Publication Data

US 2008/0288788 A1 Nov. 20, 2008

Related U.S. Application Data

(60) Provisional application No. 60/924,478, filed on May 16, 2007.

(51) Int. Cl.
G06F 11/30 (2006.01)
G06F 21/10 (2013.01)
G06F 21/62 (2013.01)

(52) U.S. Cl.
CPC ............. *G06F 21/10* (2013.01); *G06F 21/62* (2013.01)
USPC .......................................................... 713/193

(58) Field of Classification Search
CPC .................................. G06F 21/10; G06F 21/62
USPC ................................... 713/193; 707/736, 758
See application file for complete search history.

(56) References Cited

U.S. PATENT DOCUMENTS

| 7,120,429 | B2 | 10/2006 | Minear et al. |
| 7,191,332 | B1 | 3/2007 | Pankajakshan et al. |
| 7,196,661 | B2 | 3/2007 | Harvey |
| 7,457,781 | B1 | 11/2008 | Weaver et al. |
| 7,484,103 | B2 | 1/2009 | Woo et al. |
| 7,493,289 | B2 * | 2/2009 | Verosub et al. ................ 705/51 |
| 7,555,554 | B2 | 6/2009 | Manders et al. |
| 7,584,222 | B1 | 9/2009 | Georgiev |
| 7,747,533 | B2 | 6/2010 | Zhang et al. |
| 7,779,097 | B2 | 8/2010 | Lamkin et al. |
| 7,861,312 | B2 | 12/2010 | Lee et al. |
| 8,626,931 | B2 | 1/2014 | Krig |
| 2002/0049679 | A1 | 4/2002 | Russell et al. |
| 2002/0157002 | A1 | 10/2002 | Messerges et al. |
| 2003/0028488 | A1 | 2/2003 | Mohammed et al. |
| 2003/0032406 | A1 | 2/2003 | Minear et al. |
| 2003/0131353 | A1 | 7/2003 | Blom et al. |

(Continued)

OTHER PUBLICATIONS

Office Action, dated Jan. 19, 2011, U.S. Appl. No. 12/121,636, filed May 15, 2008, 15 pages.
Office Action, dated Aug. 29, 2011, for. U.S. Appl. No. 12/121,636, filed May 15, 2008, 14 pages.
Office Action, dated Jun. 11, 2010, for U.S. Appl. No. 11/967,939, filed Dec. 31, 2007, 17 pages.

(Continued)

*Primary Examiner* — Peter Shaw
(74) *Attorney, Agent, or Firm* — Sterne, Kessler, Goldstein & Fox PLLC

(57) ABSTRACT

Methods, systems and computer program products to create and manage encapsulated Digital Rights Management (DRM) metafiles, also referred to as objects, are provided herein. Each object comprises a file header section, an encrypted webpage metadata section, an encrypted preferences section, an encrypted tracking section, an encrypted license section, a media file section and an encrypted file trailer section. Each section comprises multiple attributes. A metabase is provided herein to catalog objects, sections and attributes. Instructions are provided herein to allow for setting a current object, section or attribute; retrieving an object, section or attribute; and enumerating objects, sections and attributes in a device memory.

18 Claims, 7 Drawing Sheets

(56) References Cited

U.S. PATENT DOCUMENTS

| | | |
|---|---|---|
| 2003/0135756 A1 | 7/2003 | Verma |
| 2004/0037288 A1 | 2/2004 | Bourgart et al. |
| 2004/0139315 A1 | 7/2004 | Tokutani et al. |
| 2004/0221044 A1 | 11/2004 | Rosenbloom et al. |
| 2004/0221163 A1* | 11/2004 | Jorgensen et al. ............ 713/182 |
| 2004/0249768 A1 | 12/2004 | Kontio et al. |
| 2005/0010531 A1 | 1/2005 | Kushalnagar et al. |
| 2005/0268343 A1 | 12/2005 | Onoda et al. |
| 2006/0021012 A1 | 1/2006 | Ito |
| 2006/0053080 A1 | 3/2006 | Edmonson et al. |
| 2006/0107046 A1 | 5/2006 | Raley et al. |
| 2006/0149683 A1 | 7/2006 | Shimojima et al. |
| 2006/0195864 A1 | 8/2006 | New et al. |
| 2006/0253874 A1 | 11/2006 | Stark et al. |
| 2006/0253894 A1 | 11/2006 | Bookman et al. |
| 2006/0265758 A1 | 11/2006 | Khandelwal et al. |
| 2007/0106551 A1 | 5/2007 | McGucken |
| 2007/0136204 A1 | 6/2007 | Oh et al. |
| 2007/0198430 A1 | 8/2007 | Takahashi et al. |
| 2007/0206799 A1 | 9/2007 | Wingert et al. |
| 2007/0208668 A1 | 9/2007 | Candelore |
| 2008/0082813 A1 | 4/2008 | Chow et al. |
| 2008/0086779 A1 | 4/2008 | Blake et al. |
| 2008/0092211 A1 | 4/2008 | Klemets et al. |
| 2008/0120242 A1 | 5/2008 | Krig et al. |
| 2008/0127351 A1* | 5/2008 | Jang et al. ........................ 726/26 |
| 2008/0189348 A1 | 8/2008 | Krig |
| 2008/0189349 A1 | 8/2008 | Krig |
| 2008/0282316 A1 | 11/2008 | Sonoda et al. |
| 2009/0083429 A1 | 3/2009 | Krig |
| 2009/0150293 A1 | 6/2009 | Yen et al. |

OTHER PUBLICATIONS

Office Action, dated Jan. 3, 2011, for U.S. Appl. No. 11/967,939, filed Dec. 31, 2007, 5 pages.
Office Action, dated Jun. 21, 2011, for U.S. Appl. No. 11/967,939, filed Dec. 31, 2007, 5 pages.
Office Action, dated Aug. 17, 2011, for U.S. Appl. No. 11/967,939, filed Dec. 31, 2007, 6 pages.
Office Action, dated Jun. 11, 2010, for U.S. Appl. No. 11/967,990, filed Dec. 31, 2007, 15 pages.
Office Action, dated Aug. 31, 2011, for U.S. Appl. No. 11/967,990, filed Dec. 31, 2007, 5 pages.
Office Action, dated Jan. 10, 2012, for U.S. Appl. No. 11/967,939, filed Dec. 31, 2007, 6 pages.
Office Action, dated Jan. 11, 2012, for U.S. Appl. No. 11/967,990, filed Dec. 31, 2007, 5 pages.
Office Action, dated Jan. 19, 2012, for U.S. Appl. No. 12/121,636, filed May 15, 2008, 16 pages.
Office Action, dated Jul. 9, 2012, for U.S. Appl. No. 12/121,636, filed May 15, 2008, 16 pages.
Office Action, dated Feb. 12, 2013, for U.S. Appl. No. 12,121,636, filed May 15, 2008, 13 pages.
Office Action, dated Jul. 17, 2013, for U.S. Appl. No. 12/121,636, filed May 15, 2008, 15 pages.
Notice of Allowance, dated Jan. 3, 2014, for U.S Appl. No. 12/121,636, filed May 15, 2008, 11 pages.
Examiner's Answer to Appeal Brief, dated Jul. 16, 2012, for U.S Appl. No. 11/967,939, filed Dec. 31, 2007, 7 pages.
Office Action, dated Jun. 25, 2012, for U.S. Appl. No. 11/967,990, filed Dec. 31, 2007, 6 pages.

* cited by examiner

```
<Metabase>
<Object GUID=...>
   <Sections>
      <Section GUID=...>
      ...
      <Section GUID=...>
   </Sections>
   <Section GUID>

<Attribute GUID=...>
      ...
      <Attribute GUID=...>
   </Section>
</Object>
```

DIGITAL RIGHTS MANAGEMENT METAFILE, MANAGEMENT PROTOCOL AND APPLICATIONS THEREOF

CROSS-REFERENCE TO RELATED APPLICATIONS

This application claims the benefit of U.S. Provisional Application No. 60/924,478 filed May 16, 2007 which is incorporated herein by reference in its entirety.

BACKGROUND OF THE INVENTION

1. Field of the Invention

The present invention generally relates to multimedia communication.

2. Background Art

Currently, multiple protocols for the transfer of objects or media object such as audio, video, images and text are in use, one of them being the media transfer protocol (MTP). MTP is an extension of the industry standard picture transfer protocol (PTP). The media transfer protocol was created as an extension to the picture transfer protocol specifically for media devices and includes various provisions for digital rights management (DRM).

Current protocols may use digital rights management (DRM) and electronic license management technologies for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

However, current protocols such as MTP do not provide for effective digital rights management of media or encapsulation of media, metadata and associated licenses. Methods and systems are needed to overcome the above mentioned deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
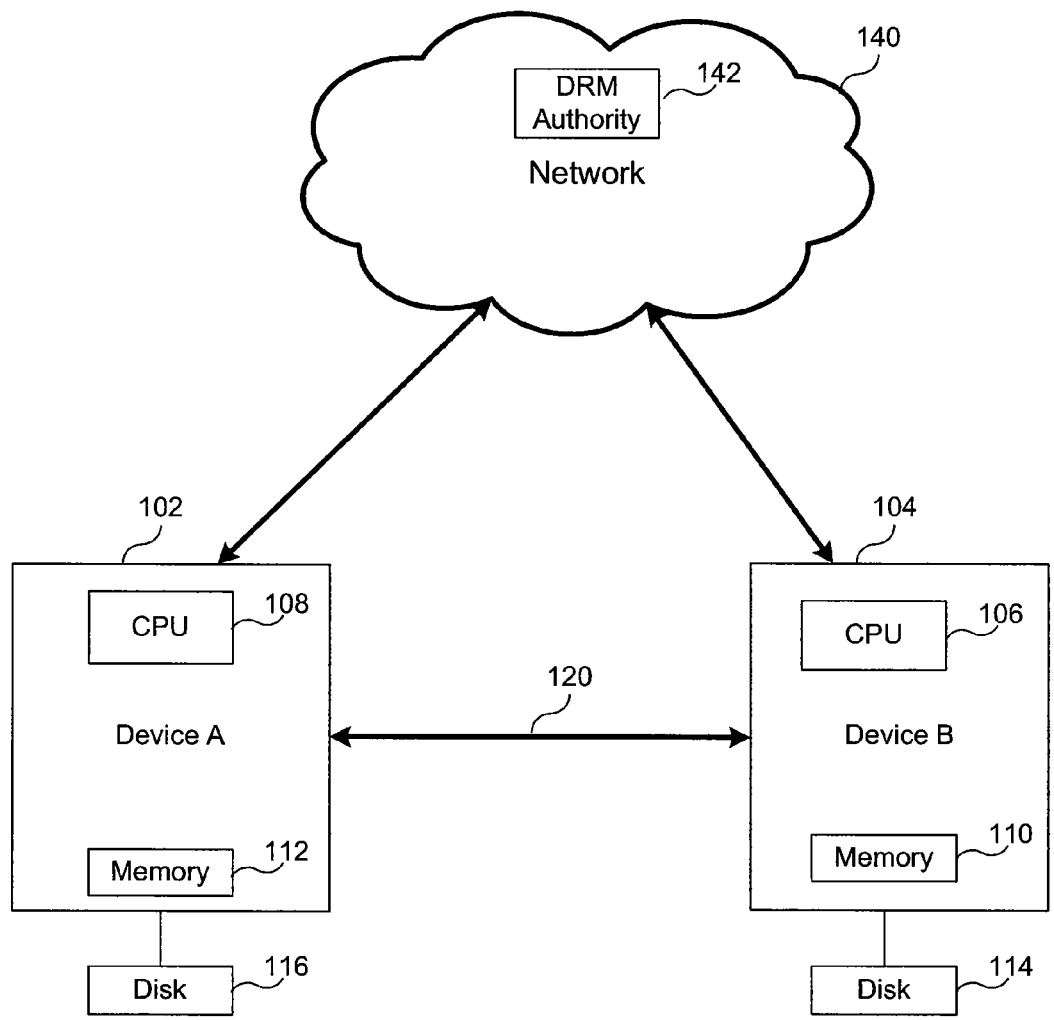
FIG. 1 is a block diagram of an exemplary system in accordance with an embodiment of the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents
1. Overview
2. The Media Transport Protocol
3. An Example Operating Environment
4. Connections between an initiator and a responder
5. Organization and Management of Metafiles
   5a. Metafile format
   5b. Identification Space
   5c. Metabase
   5d. Instruction format
   5e. Setting Current Object, Section and Attribute
   5f. Retrieving Sections of current objects and Attributes of current sections
   5g. Retrieving absolute Objects, Sections and Attributes
   5h. Enumerating Objects, sections of current objects and Attributes of current sections
   5i. Enumerating sections of absolute Objects and attributes of absolute sections
   5j. Retrieving metabase
6. Example General Purpose Computer System
7. Conclusion

1. OVERVIEW

The present invention provides methods, systems and computer program products to create and manage encapsulated Digital Rights Management (DRM) metafiles, also referred to as objects. Each object comprises multiple sections. Each section comprises multiple attributes. A metabase is provided herein to catalog objects, sections and attributes. Instructions are provided herein to allow for setting a current object, section or attribute; retrieving an object, section or attribute; and enumerating objects, sections and attributes in a device memory.

An operation as referred to herein may be sent by an initiator (as described below with reference to FIG. 1) or responder (described below with reference to FIG. 1). An operation either requests information or provides information in the form of a dataset or property. An operation may include but is not limited to an operation code field (arbitrary value based on design), multiple operation parameters fields, a data field that may include an optional dataset, a field for response code and a plurality of response parameters. The data direction field indicates the direction of data transfer, either from an initiator to a responder or from a responder to an initiator. Response codes include but are not limited to "OK" which indicates that the recipient of the operation accepts the operation, "parameter not supported" which indicates the either an operation or response parameter is not supported, "operation not supported" which indicates that the operation is not supported, "session not open" which indicates that a session is not open, "invalid transaction identification" which indicates that the transaction identification is invalid and "device busy" which indicates that the recipient of the operation is currently unavailable to service the requested operation.

An event as referred to herein may be sent by an initiator or responder and may include but is not limited to a field for event code, multiple fields for event parameters and a data field that may include an optional dataset. An event is used to notify of a change in status of the sending entity.

A property as referred to herein may be sent by an initiator or a responder and may include but is not limited to fields such as a "property code" that identifies the property, "data type" that indicates the data type of the property, "get/set" which indicates whether the responder is to return a value or set a value, "default value" which indicates the default value of the property, "group code" which indicates the group identifier and "form flag" which may be set by the sender of the property.

A dataset as referred to herein may be sent by an initiator or a responder and may include but is not limited to fields such as a "dataset field" that indicates the type of data, a "field order" that indicates the order of the type of data in the dataset, a "length" field that indicates the size of the data and a "datatype" field that indicates the data type of the data.

In an embodiment, each entry under the "dataset field" may be represented by a property, thus a dataset may alternatively be represented as multiple distinct properties. In embodiments, initiators and responders may exchange either entire datasets described herein or individual entries under the dataset field of a dataset that have been encapsulated as properties. For example, with reference to media player application information dataset in table, the "Manufacturer" entry may be represented by a "Manufacturer" property. Thus if only manufacturer information is needed, the manufacturer property can be sent instead of the entire dataset in table 3.

It is to be appreciated that the choice of fields to be included in operations, events and datasets to accomplish the methods described herein are a design choice and may be arbitrary.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. THE MEDIA TRANSFER PROTOCOL (MTP)

The media transfer protocol (MTP) is an extension of the industry standard picture transfer protocol (PTP). The media transfer protocol was created as an extension to the picture transfer protocol specifically for media devices and includes various provisions for digital rights management (DRM).

Digital rights management (DRM) and electronic license management technologies may be utilized for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

PIMA 15740:2000 provides a common communication mechanism for exchanging images with and between digital still photography devices (DSPDs). This includes communication between digital still photography devices and host computers, printers, other digital still devices, telecommunications kiosks, and image storage and display devices. This standard presents a protocol that is intended to be transport and platform independent. Exemplary transports include USB (Universal Serial Bus), IEEE 1394, and IrDA (Infrared Data Association).

The generic media container, metabase and instructions to manage the media container and metabase presented herein may be used with MTP or any other media transfer protocol.

3. EXAMPLE OPERATING ENVIRONMENT

FIG. 1 is a block diagram of an exemplary system comprising a plurality of devices which are communicatively coupled and create, utilize and/or manage one or more objects or "media containers" described herein, in accordance with an embodiment of the invention.

Referring to FIG. 1 there is shown one or more connections or links 120 that facilitates communication between a device 102 and a device 104. Link 120 may be in the form of wired or wireless connection. Link 120 may be part of network 140. The system illustrated in FIG. 1 enables a method for transmitting commands/requests and receiving responses between computational device 102, computational device 104 and network 140. Computation device 102 may be a host computer (e.g. a personal computer) and computational device 104 may be a media player device (e.g. an iPOD). Network 140 may include a DRM authority 142 that manages licenses for media content stored on device 102 and/or device 104.

The device 102 may comprise suitable logic, circuitry and/or code that may enable transfer of information to and from the device 104 via instructions described below. In one embodiment of the invention, the device 102 may be a host computer referred to as an "initiator", and that may handle the exchange of for example, objects, media content and messages with the device 104. According to an embodiment of the invention media (such as audio, video, images, e-books and data files) may be encapsulated along with an associated Digital Rights Management license(s) and metadata in a "media container" referred to an as object 300 (see FIG. 3A). "Object", "media object" and "DRM metafile" are used interchangeably throughout the present application. Media as referred to herein includes but is not limited to video, audio, images, e-books and any other type of data file.

Figure 5:
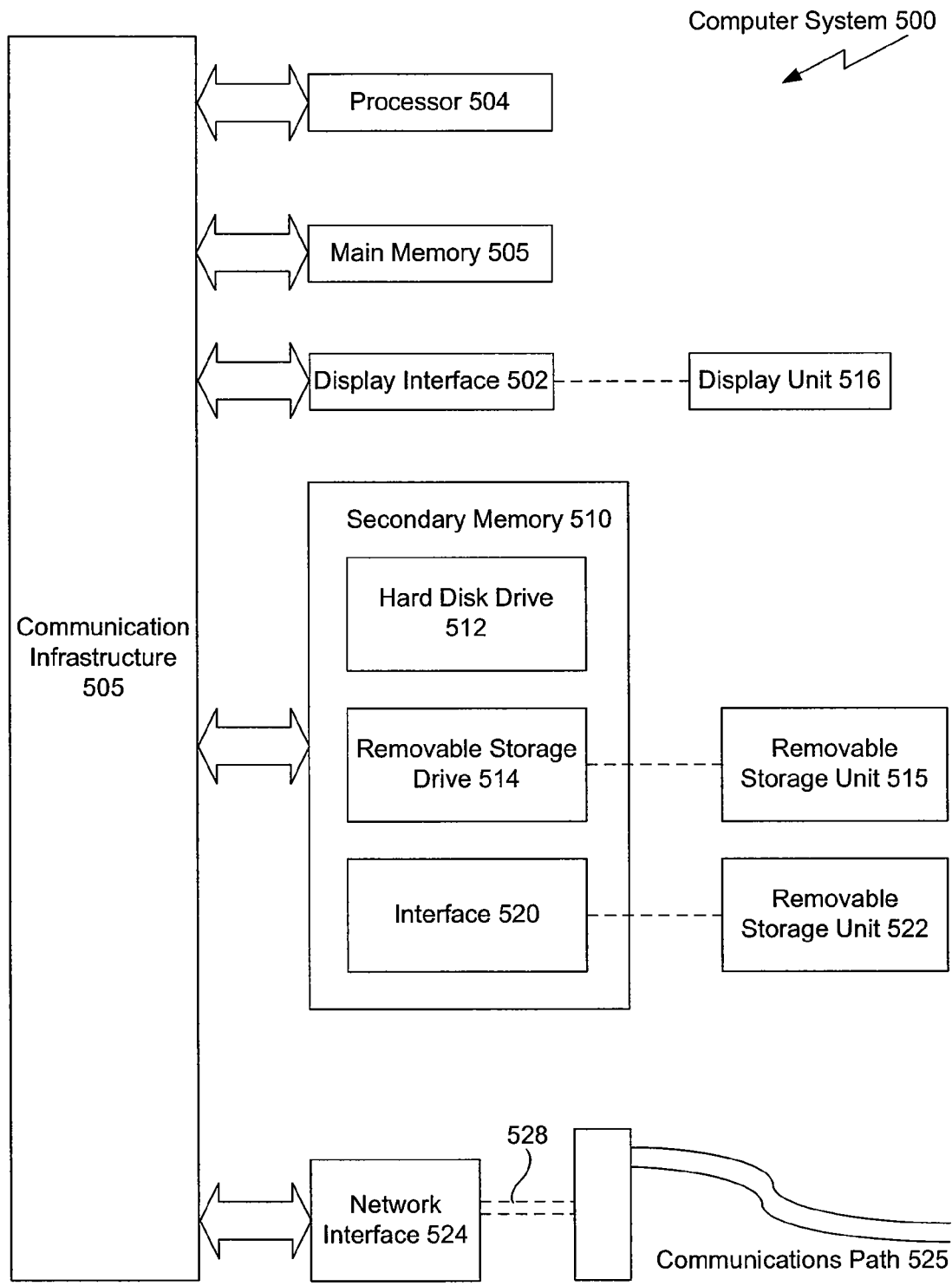
FIG. 5 is a block diagram of a computer system on which the present invention can be implemented.

The device 104 may comprise suitable logic, circuitry, and/or code that may enable the transfer of information to and from the device 102. In one embodiment of the invention, the device 104 may be a hand-held device referred to in the MTP specification as a "responder", and that may handle the exchange of, for example, media content and DRM metafiles with device 102. It is to be appreciated that initiator 102 and responder 104 may be any computational device, including but not limited to one or more of a portable media player device such as an Motion Picture Experts Group (MPEG) Audio Layer 3 (MP3) player, a mobile communications device such as a cellular phone, a Global Positioning Satellite (GPS) device such as a navigation system, a communications device such as a Wireless Fidelity (WiFi) or internet enabled communications device, a medical device or a device with an embedded controller. In an embodiment, initiator 102 or responder 104 may include computer system 500 or portions of computer system 500 as shown in FIG. 5 and described below. It is to be appreciated that there may be multiple initiators 102 and responders 104 with interchangeable functionality.

In an embodiment, initiator 102 and responder 104 are coupled to network 140 which includes a DRM authority 142. DRM authority 142 may be, for example, an online multimedia store that sells media along with associated DRM license(s). DRM authority 142 may control, for example, the duration of validity of a DRM license. DRM authority 142 may also authorize or deny transfer of media between devices 102 and 104. In an embodiment, transactions of media or objects between initiator 102 and responder 104 may have to be approved by DRM authority 142. For example, if device 102 requests device 104 for a particular object and if a license associated with the object requires authorization from DRM authority 142, then the request is also sent to DRM authority 142 for approval. If the transfer is approved, device 104 transfers the requested media content to device 102. DRM authority 142 may be implemented in hardware, software, firmware or any combination thereof.

4. EXAMPLE CONNECTION BETWEEN AN INITIATOR AND A RESPONDER

Figure 2:
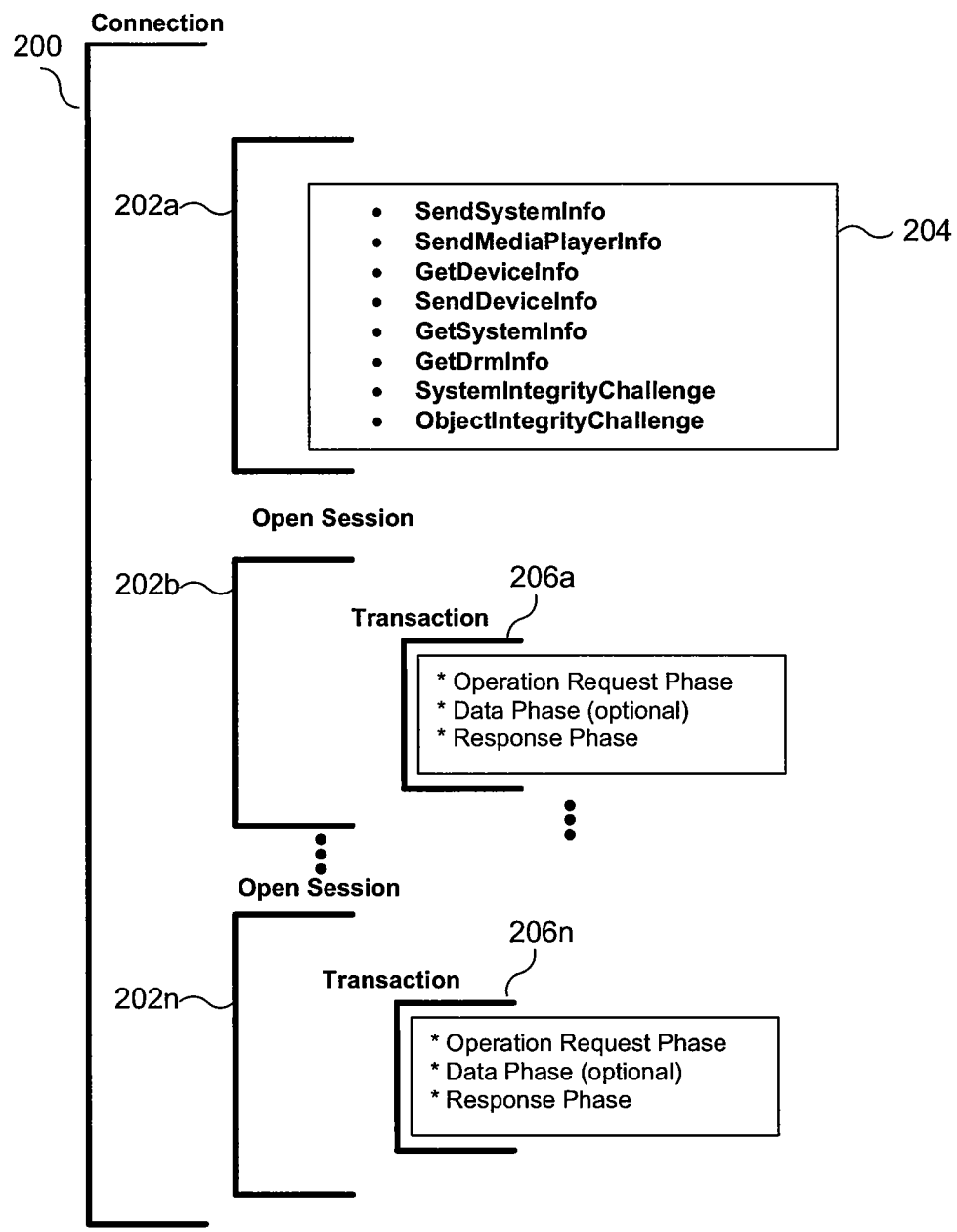
FIG. 2 illustrates an example connection according to an embodiment of the invention.

FIG. 2 illustrates an example connection 200 between initiator 102 and responder 104 according to an embodiment of the invention. Connection 200 between initiator 102 and responder 104 may be via a physical or a wireless medium including but not limited to Universal Serial Bus (USB), Wireless Fidelity (WiFi), Bluetooth, Transport Control Protocol/Internet Protocol (TCP/IP), Infrared Data Association (IrDA). During the life of connection 200, initiator 102 and responder 104 communicate by opening sessions 202 and conducting transactions 206 within open sessions 202. A "transaction" between initiator 102 and responder 104 comprises one or more of an operation, an event and a response. The response may be in the form of an operation or event.

In the duration of connection 200, device and system information 204 is exchanged in the first session 202a between initiator 102 and responder 104. After the exchange of device and system information 204 in first session 202c, further sessions 202b-202n can be conducted without re-exchanging device and system information 204. As a result the overhead of exchanging device and system information 204 at the start of each session 202 is eliminated thereby significantly reducing overhead and speeding up transactions 206 between initiator 102 and responder 104. Another advantage of the present embodiment is that exchanging device and system information 204 at the start of connection 200 allows responder 104 to learn limitations of initiator 102 and configure its internal programs (running on processor 106) accordingly. In an embodiment, responder 104 may disclose to initiator 102 certain predetermined operations, events and properties based on a version of an operating system or media player application running on processor 108 of initiator 102.

In an embodiment, subsequent to a disconnection that terminates connection 200, initiator 102 and responder 104 again exchange system and device information 204 at the start of a new connection (not shown). In this case, initiator 102 and responder 104 re-exchange information in the event that either initiator 102 or responder 104 has changed hardware configuration or software during the connection due to, for example, a system and/or software change/upgrade.

In an embodiment, system and device information includes but is not limited to one or more of transmission protocols supported, driver vendor number, driver vendor ID, operating system used, operating system revision number, operating system patch information, hardware information (manufacturer, make, model and capabilities), internationalization (such as country, language and time zone), media player name and media player version.

It is to be appreciated that the example connection 200 is optional and may not be needed to implement a generic media containers, objects and/or instructions DRM framework between an initiator and responder.

5. DRM METAFILE AND MANAGEMENT OF OBJECTS

5a. Metafile Format

Conventional digital rights management systems do not encapsulate media files and their corresponding digital rights management licenses. In other words, conventional systems do not combine or attach a media file with its corresponding digital rights management license(s). This lack of encapsulation often leads to orphaned media files in the event that a DRM license is corrupted or not downloaded with the associated media file. Furthermore, conventional systems provide no effective way to encapsulate or manage media metadata. Embodiments of the invention presented herein provide an encapsulated object including a media file, metadata and DRM license. Methods to manage the object are also provided. Embodiments presented herein allow for modular storage of media characteristics in sections and attributes of each object.

Each object comprises multiple sections and each section comprises multiple attributes. Each of objects, sections, and attributes have an associated globally unique identification (GUID) associated with them. Object have "object_GUIDs", sections have "section_GUIDs" and attributes have "attribute_GUIDs." In an embodiment, GUIDs are 128-bits wide and alphanumeric. It is to be appreciated by persons of skill in the art that the number of bits for a GUID and its format is arbitrary.

Figure 3A:
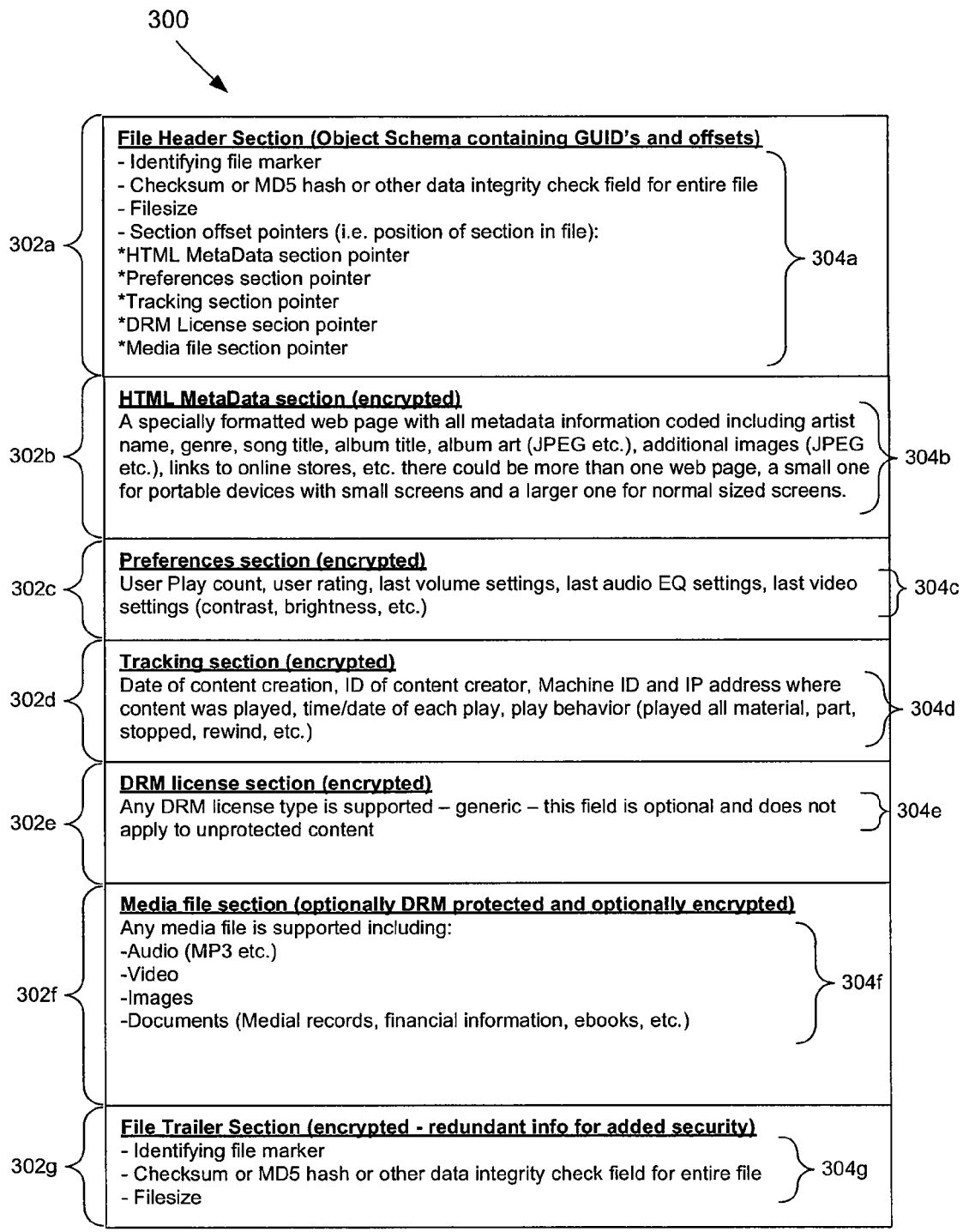
FIG. 3A illustrates an example object including sections and attributes according to an embodiment of the invention.

FIG. 3A illustrates an example object 300, according to an embodiment of the invention. Object 300 comprises sections 302a-g. Sections 302a-g comprise corresponding attributes 304a-g, for example, section 302a comprises attributes 304a1-am; section 302b comprises attributes 304b1-bn, etc. where m and n are variable based on the number of attributes in a section. Embodiments of the invention presented herein provide instructions for retrieval of an entire object 300 which will by default also retrieve all of the object's sections 300 and attributes 304. Instructions provided herein also allow for selective retrieval of a section 302 within object 300 which will by default also retrieve all of the section's associated attributes 304. Alternatively, instructions presented herein also allow for selective retrieval of attributes 304 within a section 302.

Section 302a is a file header section that comprises object schemas including an object_GUID for object 300, section_GUIDs for sections 302, attribute_GUIDs for attributes 304 and offsets.

Attributes 304a in section 302a include an identifying file marker that is used to identify a type of media encapsulated in object 300. For example, the file marker may indicate the media file 304f encapsulated as one of, for example, Motion Picture Experts Group (MPEG) Audio Layer 3 (mp3), Motion Picture Experts Group (MPEG) or Joint Photographic Experts Group (JPEG) file. Attribute 304a includes a checksum or cryptographic code that is used to check the data integrity for object 300. Cryptographic codes include but are not limited to Advanced Encryption Standard (AES), Data Encryption Standard (DES), Secure Hash Algorithm 1 (SHA 1), Elliptic Curve Cryptography (ECC), Secure Hash Algorithm 2 (SHA 2), Message Digest 4 (MD4), Message Digest 5 (MD5), Rivest Cipher 4 (RC4) and Rivest Cipher 5 (RC5). Attribute 304a also includes the file size of object 300. Attribute 304a further includes a section offset pointer that indicates the position of each section within object 300. For example, attributes 304a include pointers that point to each of HTML metadata section pointer 302b, user preferences section 302c, tracking section 302d, DRM license section 302e and media file section 302f.

Section 302b is a Hyper Text Markup Language (HTML) metadata section is a specially formatted web page using HTML or other structured description formats such as Adobe Air, Dynamic HTML (DHTML) or Javascript. The formatted web page includes encoded metadata that provides information about encapsulated media within object 300. Section 302b may include attributes such as artist name, genre, song title, album title, album art, additional images, and links to online stores. In an embodiment section 302b may include only one web page for computational devices that have small screens and may include more than one web for computational devices that have larger screens.

Section 302c stores users preferences specific to a media player and/or media 304f. Section 302c may be encrypted. Preferences section 302c, may include attributes including but not limited to settings for devices such as media players and media 304f. Preferences include but are not limited to last volume settings, last audio equalizer settings, last video settings such as contrast or brightness.

Tracking section 302d is used to track media 304f and media player identification. For example, tracking section 302d includes attributes 304d. Attributes 304d include but are not limited to date of content creation, identification of content creator, computational device identification and Internet Protocol (IP) address of the media player. The tracking section may also include where content was played, purchasing transaction information such as a digital sales receipt showing vendor and purchaser information, time and date for each play, and whether the content was played in totality, partially, where it was stopped if played partially or whether it was rewinded or forwarded. Attributes 304d may also include user play count for a media object 304f and user rating for a media object 304f.

Section 302e is a DRM license section that includes a DRM license for media object 304f. This field may be optional since DRM licenses do not apply to unprotected content. Attributes 304e within DRM license section 302e specify the type of DRM license being used.

Media file section 302f is the media content that is being protected by the DRM license. In an embodiment, section 302f may be optional. Attributes 304f includes but is not limited to a media object such as audio, video, images and documents.

File trailer section 302g includes information redundant to header section 302a for added security. Attributes 304g include file size, identifying file marker, checksum, MD5, hash or other integrity data check fields as in attributes 304a.

It is to be appreciated by persons of skill in the art that some of the sections 302 described above may be interpreted as metadata in part or in totality.

Figure 3B:
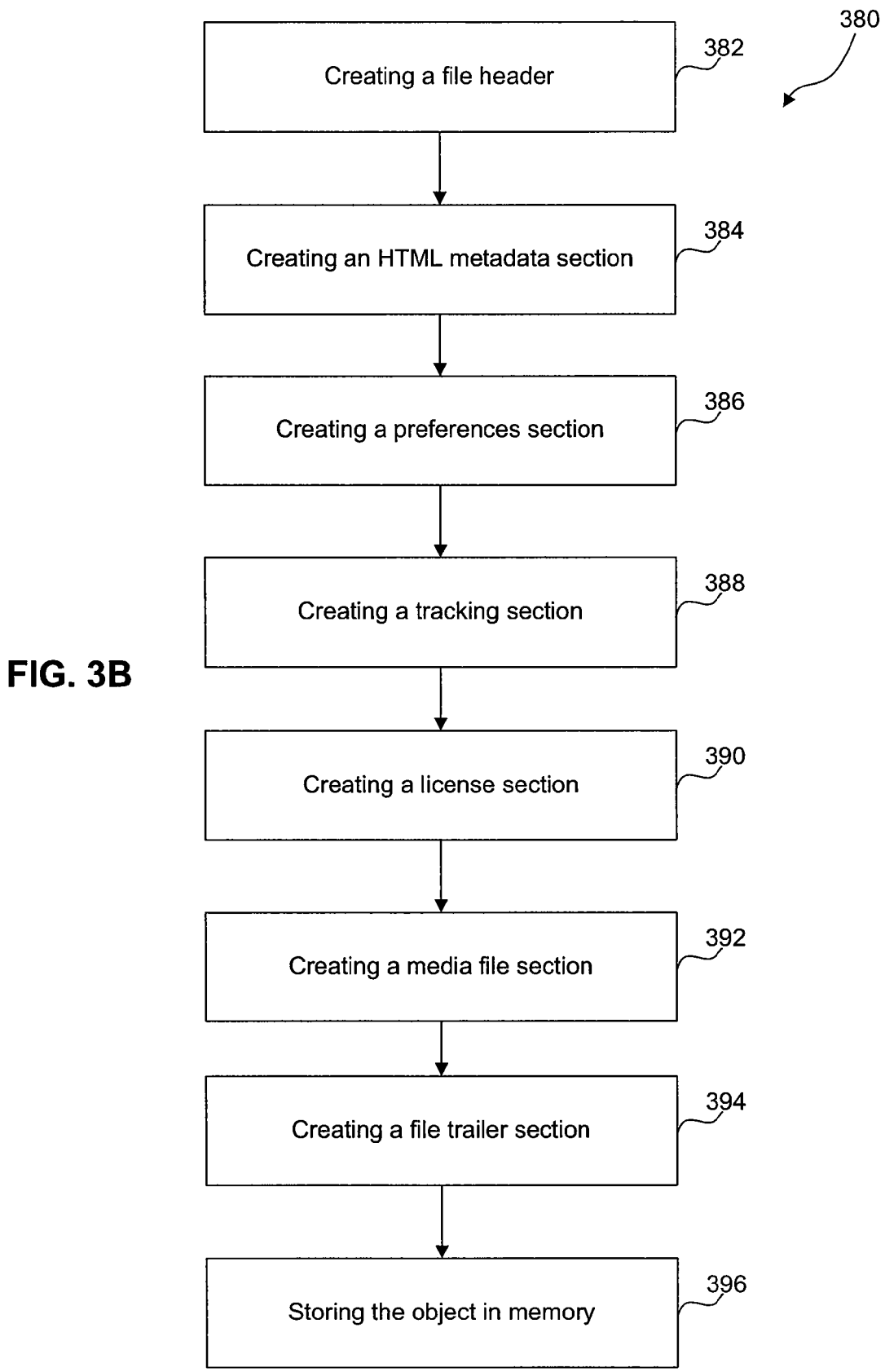
FIG. 3B illustrates an example flow chart illustrating steps performed to create an object including sections and attributes according to an embodiment of the invention.

FIG. 3B illustrates an example flow chart 380 illustrating steps performed to create a DRM media file or object 300 according to an embodiment of the invention. Object 300 comprises sections 302 and attributes 304. Flowchart 380 will be described with continued reference to the example operating environment depicted in FIG. 1. However, the flowchart is not limited to that embodiment. Note that some steps shown in flowchart 380 do not necessarily have to occur in the order shown.

In step 382, a file header section is created. The file header section is configured to store a first data integrity code, media file type, unique identification, size of the media container and pointers to multiple sections of the object. An example of a file header section is section 302a.

In step 384, an encrypted Hyper Text Markup Language (HTML) metadata section is created using HTML or other structured description formats such as Adobe Air, Dynamic HTML (DHTML) or Javascript. The HTML metadata section is configured to store data that enables a computational device to display a web page with information on media stored within the DRM media object. An example of a HTML metadata section is section 302b.

In step 386, an encrypted preferences section is created. The preferences section is configured to store a user's preferences for utilizing the media. An example of a preferences section is section 302c.

In step 388, an encrypted tracking section is created. The tracking section is configured to store media identification and computational device identification, usage history and DRM history. An example of a tracking section is section 302d.

In step 390, an encrypted license section is created. The license section is configured to store a DRM license associated with the media. An example of a license section is section 302e.

In step 392, a media file section is created. The media file section is configured to store one or more media files. An example of a media file section is section 302f.

In step 394, an encrypted file trailer section is created. The file trailer section is configured to indicate termination of the media object and store a second data integrity code and a size of the media container. An example of a file trailer section is section 302g.

In step 396, the object and its sections are stored in the memory of the computational device. For example, object 300 is stored in memory 112 or memory 110.

5b. Identification Format and Identification Space

According to an embodiment of the invention, objects 300 are identified by a globally unique object_identification (object_GUID), sections 302 within objects 300 are identified by a globally unique section_identification (section_GUID) and attributes 304 within section 302 are identified by a globally unique attribute_identification (attribute_GUID).

An example format that may be used to address objects 300, sections 302 and attributes 304 is:

object_GUID.section_GUID.attribute_GUID

A user may address an object 300 by simply referring to the respective object_GUID. A section 302 within object 300 may be addressed as object_GUID.section_GUID. An attribute 304 within a section 302 of an object 300 may be addressed as object_GUID.section_GUID.attribute_GUID. According to an embodiments of the invention described below, instructions with object_GUID, section_GUID and attribute_GUID encoded therein are used to cause a processor, such as processor 106 or processor 108, to point to, retrieve or enumerate objects 300, sections 302 and/or attributes 304 identified by one or more of object_GUID, section_GUID and attribute_GUID.

Objects 300, sections 302 and attributes 304 may share a global numbering space. Alternatively, Objects 300, sections 302 and attributes 304 may each have individually unique numbering spaces. The object_identification, section identification and attribute identification numbering spaces may be implemented as unsigned 128-bit integers.

5c. Metabase

Figure 4A:
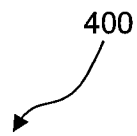
FIG. 4A illustrates an example metabase according to an embodiment of the invention.

FIG. 4A illustrates an example metabase 400 according to an embodiment of the invention. Metabase is a spreadsheet or master database of all objects 300. Metabase 400 is in an EXtensible Markup Language (XML) format. Metabase may alternatively be in a spreadsheet format listing of all objects 300. Alternatively metabase 400 may be an American Standard Code for Information Interchange (ASCII) flat file. It is to be appreciated that the format of the metabase 400 is arbitrary. The metabase 400 contains the complete object schemas for each object 300. Metabase 400 includes sections 302 for each object 300 and attributes for each section 302. Metabase 400 may be stored in memory of any computational device, for example, memory 112 of corresponding device 102 or memory 110 of device 104. It is to be appreciated that objects 300 and metabase 400 may be stored in any form of storage, including but not limited to memory 110, memory 112, disk 116 or disk 114.

Figure 4B:
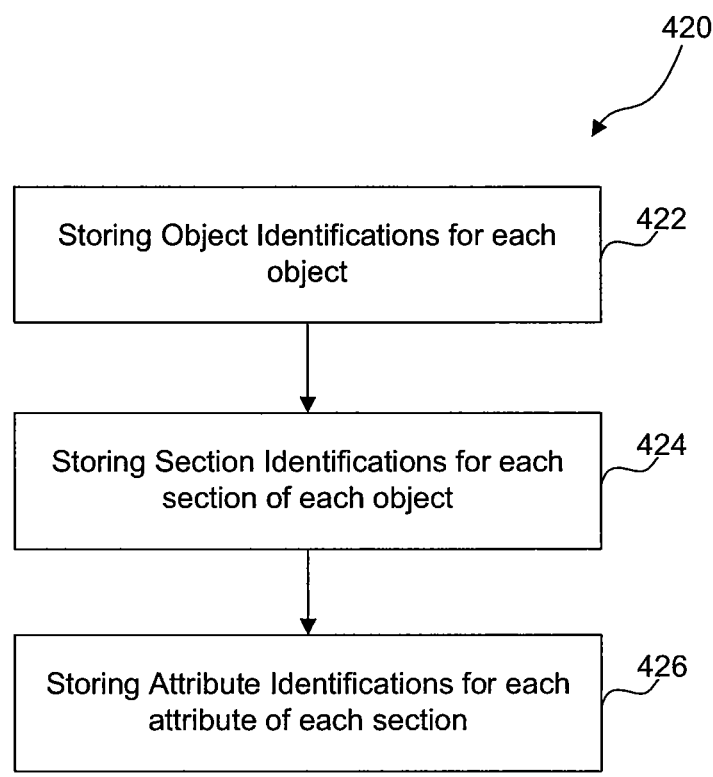
FIG. 4B illustrates an example flow chart illustrating steps performed to create a metabase according to an embodiment of the invention.

FIG. 4B illustrates an example flow chart 420 illustrating steps performed to create a metabase 400 according to an embodiment of the invention. Flowchart 420 will be described with continued reference to the example operating environment depicted in FIG. 1. However, the flowchart is not limited to that embodiment. Note that some steps shown in flowchart 420 do not necessarily have to occur in the order shown.

In step 422, object identifications are stored for each object stored in memory. For example, object identifications are stored in metabase 400 for each object 300 stored in memory 110 or memory 112.

In step 424, section identifications are stored for each section of each object stored in memory. For example, section identifications are stored in metabase 400 for each section 302 of each object 300 stored in memory 110 or memory 112.

In step 426, attribute identifications are stored for each attribute of each section of each object stored in memory. For example, attribute identifications are stored in metabase 400 for each attribute 304 of each section 302 of each object 300 stored in memory 110 or memory 112.

5d. Instruction Format

According to an embodiment of the invention, request and response instructions described below are used to manage and manipulate objects 300, sections 302 and attributes 304. Request instructions are sent and response instructions are returned in response to each request instructions. Request and response instructions may be sent, for example, from device 102 to device 104 and vice versa. In an embodiment, computational devices within network 140 may send request and response instructions. Instruction are variable in length and are composed of a minimum 32 bits unsigned integer (UNIT32) Opcode field. Example request instructions and response instructions may have the following 128 bit format in hexadecimal:

TABLE 1

| UINT32 Length high 32 | UINT32 Length low 32 | UINT32 Opcode instruction | UINT32 Operand 1 instruction | UINT32 Operand n instruction | UINT8 array Payload |
| --- | --- | --- | --- | --- | --- |

The instruction format in table 1 above includes length, opcode, operand and payload fields. The length fields are used to indicate the length of the instruction including opcode, operand and payload fields. The difference between the request and the response instructions is that the top bit of the opcode is set for response instructions and is cleared for the request instructions. Request instructions may be represented as:

0x0XXX XXXX XXXX XXXX XXXX XXXX XXXX.

Response instructions may be represented as:

0x1XXX XXXX XXXX XXXX XXXX XXXX XXXX

Example instructions to manage and manipulate objects 300, sections 302 and attributes 304 are described below. In an embodiment a request instruction is encoded with one or more of an object identification, section identification and attribute identification prior to sending or transmitting the instruction. The request instruction may be encoded by, for example, processor 108 of computational device 102. The encoded instruction is sent or transmitted to computational device 104 via link 120. The instruction causes a processor, for example processor 106 to set a pointer to point to one of an object, section or attribute; retrieve an object, section or attribute; enumerate objects, sections or attributes; and retrieve a metabase based on values encoded in the instructions. Processor 108, in response to a request instruction may encode a response instruction to indicate success or failure of the request and send the response instruction. The response instruction may also be encoded with a payload that includes one or more of an object identification, section identification, attribute identification; object, section or attribute; list of objects, sections and attributes or a metabase if applicable.

5e. Setting Current Object, Section and Attribute

Table 2 below shows example format of a "set current object request" instruction.

TABLE 2

| | |
| --- | --- |
| Opcode | 0x00000001 |
| Operand 1 | Object GUID part 3 |
| Operand 2 | Object GUID part 2 |
| Operand 3 | Object GUID part 1 |
| Operand 4 | Object GUID part 0 |
| Payload | N/A |

According to an embodiment of the invention, the set current object instruction causes a processor to point a pointer in memory to the object specified by the object_IDs specified by operands 1-4. This allows subsequent use of further instructions to access sections and attributes of the current object without use of the object_ID of the current object. For example, processor 108 may send a set current object instruction to processor 106 causing processor 106 to set a pointer to point in memory 110 to the object specified by the object_IDs specified by operands 1-4 and enable access to sections and attributes of the current object.

Table 3 below shows an example format of a "set current object response" instruction that is sent in response to the instruction from table 2 above.

TABLE 3

| | |
| --- | --- |
| Opcode | 0x80000001 |
| Operand 1 | 0x00000000 for Success; 0x00000001 for Error |
| Operand 2 | Object GUID part 3 |
| Operand 3 | Object GUID part 2 |
| Operand 4 | Object GUID part 2 |
| Operand 5 | Object GUID part 1 |
| Payload | N/A |

The set current object response instruction above is sent by, for example, processor 106 to processor 108 to indicate success or failure in setting the pointer in memory 110 to point to the specified object in the request instruction. Operands 2-5 are included only if processor 108 fails to set the pointer to a current object specified by the set current object request instruction received from processor 108.

Table 4 below shows example format of a "set current section in current object request" instruction.

TABLE 4

| Opcode | 0x00000002 |
|---|---|
| Operand 1 | Section GUID part 3 |
| Operand 2 | Section GUID part 2 |
| Operand 3 | Section GUID part 1 |
| Operand 4 | Section GUID part 0 |
| Payload | N/A |

According to an embodiment of the invention, the set current section in current object request instruction causes a processor to point a pointer in memory to the section of a current object specified by the section_IDs in operands 1-4. This allows subsequent use of further instructions to access attributes of the current section without use of the object_ID or section_ID of the current object and section. This instruction is subsequent to the set current object request instruction that sets a pointer to a current object. For example, processor 108 may send a set current section in current object instruction to processor 106 causing processor 106 to set a pointer to point in memory 110 to the section of a current object as specified by the section_IDs specified by operands 1-4 and enable access to attributes of the current section.

Table 5 below shows an example format of a "set current section in current object response" instruction that is sent in response to the instruction from table 4 above.

TABLE 5

| Opcode | 0x80000002 |
|---|---|
| Operand 1 | 0x00000000 for Success; 0x00000001 for Error |
| Operand 2 | Section GUID part 3 |
| Operand 3 | Section GUID part 2 |
| Operand 4 | Section GUID part 2 |
| Operand 5 | Section GUID part 1 |
| Payload | N/A |

The set current section in current object response instruction above is sent by, for example, processor 106 to processor 108 to indicate success or failure in setting the pointer in memory 110 to point to the section in the current object as specified in the request instruction from table 4. Operands 2-5 are included only if processor 106 fails to set the pointer to a current section in the current object as specified by a set current section in current object request instruction received from processor 106.

5f. Retrieving Sections of Current Objects and Attributes of Current Sections

Table 6 below shows example format of a "request section of current object" instruction.

TABLE 6

| Opcode | 0x00000003 |
|---|---|
| Operand 1 | Section GUID part 3 |
| Operand 2 | Section GUID part 2 |
| Operand 3 | Section GUID part 1 |
| Operand 4 | Section GUID part 0 |
| Payload | N/A |

According to an embodiment of the invention, the request section in current object instruction causes a processor to return a section 302 of a current object as specified by the section_GUIDs in operands 1-4. This instruction is subsequent to the set current object request instruction that sets a pointer to a current object. For example, processor 108 may send a request section of current object instruction to processor 106 causing processor 106 to return the section of a current object as specified by the section_IDs specified by operands 1-4.

Table 7 below shows an example format of a "request section of current object response" instruction that is sent in response to the instruction from table 6 above.

TABLE 7

| Opcode | 0x80000003 |
|---|---|
| Operand 1 | 0x00000000 for Success; 0x00000001 for Error |
| Payload | Requested Section |

The request section of current object response instruction is sent by, for example, processor 106 to processor 108 with an operand to indicate success or failure in retrieving a requested section. The payload field includes the requested section if processor 106 is successful in retrieving the requested section specified in the request section of current object instruction.

Table 8 below shows example format of a "request attribute of current section" instruction.

TABLE 8

| Opcode | 0x00000004 |
|---|---|
| Operand 1 | Attribute GUID part 3 |
| Operand 2 | Attribute GUID part 2 |
| Operand 3 | Attribute GUID part 1 |
| Operand 4 | Attribute GUID part 0 |
| Payload | N/A |

According to an embodiment of the invention, the request attribute in current section instruction causes a processor to return an attribute 304 of a current section as specified by the attribute_GUIDs in operands 1-4. This instruction is subsequent to the set section in current object request instruction that sets a pointer to point to a section of a current object. For example, processor 108 may send a request attribute in current section instruction to processor 106 causing processor 106 to return the attribute of a current section as specified by the attribute_IDs specified by operands 1-4.

Table 9 below shows an example format of a "request attribute of current section response" instruction that is sent in response to the instruction from table 8 above.

TABLE 9

| Opcode | 0x80000004 |
|---|---|
| Operand 1 | 0x00000000 for Success; 0x00000001 for Error |
| Payload | Requested Attribute |

The request attribute of current section response instruction is sent by, for example, processor 106 to processor 108 with an operand to indicate success or failure in retrieving a requested attribute. The payload field includes the requested attribute if processor 106 is successful in retrieving from memory 110 the requested attribute specified in the request attribute of current section instruction.

5g. Retrieving Absolute Objects, Sections and Attributes

Table 10 below shows example format of a "request absolute object" instruction according to an embodiment of the invention.

TABLE 10

| Opcode | 0x00000005 |
|---|---|
| Operand 1 | Object GUID part 3 |
| Operand 2 | Object GUID part 2 |
| Operand 3 | Object GUID part 1 |
| Operand 4 | Object GUID part 0 |
| Payload | N/A |

According to an embodiment of the invention, the request absolute object instruction causes a processor to retrieve an object from memory as specified by the object_IDs in operands 1-4. For example, processor 108 may send a request absolute object instruction to processor 106 causing processor 106 to retrieve a requested object from memory 110 as specified by the object_IDs in operands 1-4.

Table 11 below shows an example format of a "request absolute object response" instruction that is sent in response to the request absolute object instruction.

TABLE 11

| Opcode | 0x80000005 |
|---|---|
| Operand | 0x00000000 for Success; 0x00000001 for Error |
| Payload | Requested Object |

The request absolute object response instruction is sent by, for example, processor 106 to processor 108 with an operand to indicate success or failure in retrieving the requested object. The payload field includes the requested object if processor 106 is successful in retrieving from memory 110 the requested object as specified in the request absolute object instruction.

Table 12 below shows example format of a "request absolute section" instruction according to an embodiment of the invention.

TABLE 12

| Opcode | 0x00000006 |
|---|---|
| Operand 1 | Object GUID part 3 |
| Operand 2 | Object GUID part 2 |
| Operand 3 | Object GUID part 1 |
| Operand 4 | Object GUID part 0 |
| Operand 5 | Section GUID part 3 |
| Operand 6 | Section GUID part 2 |
| Operand 7 | Section GUID part 1 |
| Operand 8 | Section GUID part 0 |
| Payload | N/A |

According to an embodiment of the invention, execution of the request absolute section instruction causes a processor to retrieve a section of an object from memory as specified by the object_IDs in operands 1-4 and section_IDs in operands 5-8. For example, processor 108 may send a request absolute section instruction to processor 106 causing processor 106 to retrieve the requested section of an object from memory 110 as specified by the object_IDs in operands 1-4 and section_IDs in operands 5-8.

Table 13 below shows an example format of a "request absolute section response" instruction that is sent in response to the request absolute section instruction.

TABLE 13

| Opcode | 0x80000006 |
|---|---|
| Operand 1 | 0x00000000 for Success; 0x00000001 for Error |
| Payload | Requested Section |

The request absolute section response instruction is sent by, for example, processor 106 to processor 108 with an operand to indicate success or failure in retrieving the requested section. The payload field includes the requested section if processor 106 is successful in retrieving from memory 110 the requested section as specified in the request absolute section instruction.

Table 14 below shows example format of a "request absolute attribute" instruction according to an embodiment of the invention.

TABLE 14

| Opcode | 0x00000007 |
|---|---|
| Operand 1 | Object GUID part 3 |
| Operand 2 | Object GUID part 2 |
| Operand 3 | Object GUID part 1 |
| Operand 4 | Object GUID part 0 |
| Operand 5 | Section GUID part 3 |
| Operand 6 | Section GUID part 2 |
| Operand 7 | Section GUID part 1 |
| Operand 8 | Section GUID part 0 |
| Operand 9 | Attribute GUID part 3 |
| Operand 10 | Attribute GUID part 2 |
| Operand 11 | Attribute GUID part 1 |
| Operand 12 | Attribute GUID part 0 |
| Payload | N/A |

According to an embodiment of the invention, execution of the request absolute attribute instruction causes a processor to retrieve an attribute of a section of an object from memory as specified by the object_IDs in operands 1-4, section_IDs in operands 5-8 and attribute_IDs in operands 9-12. For example, processor 108 may send a request absolute attribute instruction to processor 106 causing processor 106 to retrieve the requested attribute of a section of an object from memory 110 based on the object_IDs in operands 1-4, section_IDs in operands 5-8 and attribute_IDs in operands 9-12.

Table 15 below shows an example format of a "request absolute attribute response" instruction that is sent in response to the request absolute attribute instruction.

TABLE 15

| Opcode | 0x80000007 |
|---|---|
| Operand 1 | 0x00000000 for Success; 0x00000001 for Error |
| Payload | Requested Attribute |

The request absolute attribute response instruction is sent by, for example, processor 106 to processor 108 with an operand to indicate success or failure in retrieving the requested attribute. The payload field includes the requested attribute if processor 106 is successful in retrieving from memory 110 the requested attribute as specified in the request absolute attribute instruction.

5h. Enumerating Objects, Sections of Current Objects and Attributes of Current Sections Table 16 below shows example format of a "enumerate objects" instruction.

TABLE 16

| Opcode | 0x00000008 |
|---|---|

According to an embodiment of the invention, the enumerate objects instruction causes a processor to return a list of all object in an associated memory. For example, processor 108 may send a enumerate objects instruction to processor 106 causing processor 106 to return a list of all objects within memory 110. The list may be a list of object_GUIDs in an array.

Table 17 below shows an example format of a "enumerate objects response" instruction that is sent in response to the enumerate objects instruction.

TABLE 17

| Opcode | 0x80000008 |
|---|---|
| Operand 1 | 0x00000000 for Success; 0x00000001 for Error |
| Payload | Array of object_GUIDs |

The enumerate objects response instruction is sent by, for example, processor 106 to processor 108 with an operand to indicate success or failure in retrieving the requested list of objects in memory 110. The payload field includes the requested list of objects if processor 106 is successful in retrieving the list of objects from memory 110.

Table 18 below shows example format of a "enumerate sections of current object" instruction.

TABLE 18

| Opcode | 0x00000009 |
|---|---|

According to an embodiment of the invention, the enumerate sections of current object instruction causes a processor to return a list of all sections of a current object. This instruction is typically sent subsequent to the set current object request instruction that sets a pointer to a current object. For example, processor 108 may send a enumerate sections of current object instruction to processor 106 causing processor 106 to return a list of sections of a current object within memory 110. The list may be a list of section_GUIDs in an array.

Table 19 below shows an example format of a "enumerate sections of current object response" instruction that is sent in response to the instruction from table 18 above.

TABLE 19

| Opcode | 0x80000009 |
|---|---|
| Operand 1 | 0x00000000 for Success; 0x00000001 for Error |
| Payload | Array of section_GUIDs |

The enumerate sections of current object response instruction is sent by, for example, processor 106 to processor 108 with an operand to indicate success or failure in retrieving the requested list of sections of a current object in memory 110. The payload field includes the requested list of sections if processor 106 is successful in retrieving the list of sections of the current object from memory 110.

Table 20 below shows example format of a "enumerate attributes of current section" instruction.

TABLE 20

| Opcode | 0x0000000A |
|---|---|

According to an embodiment of the invention, the enumerate attributes of current section instruction causes a processor to return a list of all attributes within a current section. This instruction is typically sent subsequent to the set current section request instruction that sets a pointer to a current section. For example, processor 108 may send a enumerate attributes of current section instruction to processor 106 causing processor 106 to return a list of attributes of a current section within memory 110. The list may be a list of attribute_GUIDs in an array.

Table 21 below shows an example format of a "enumerate attributes of current section response" instruction that is sent in response to the instruction from table 20 above.

TABLE 21

| Opcode | 0x8000000A |
|---|---|
| Operand 1 | 0x00000000 for Success; 0x00000001 for Error |
| Payload | Array of attribute_GUIDs |

The enumerate attributes of current object response instruction is sent by, for example, processor 106 to processor 108 with an operand to indicate success or failure in retrieving the requested list of attributes of a current section in memory 110. The payload field includes the requested list of attributes if processor 106 is successful in retrieving the list of attributes of the current section from memory 110.

5i. Enumerating Sections of Absolute Objects and Attributes of Absolute Sections Table 22 below shows an example format of an "enumerate sections of absolute object" instruction according to an embodiment of the invention.

TABLE 22

| Opcode | 0x0000000B |
|---|---|
| Operand 1 | Object GUID part 3 |
| Operand 2 | Object GUID part 2 |
| Operand 3 | Object GUID part 1 |
| Operand 4 | Object GUID part 0 |
| Payload | N/A |

According to an embodiment of the invention, the enumerate sections of absolute object instruction causes a processor to retrieve a list of all sections of an object specified by the object_IDs in operands 1-4. For example, processor 108 may send a enumerate sections of absolute object instruction to processor 106 causing processor 106 to retrieve a list of sections of the object from memory 110 as specified by the object_IDs in operands 1-4. The list may be a list of section_GUIDs in an array.

Table 23 below shows an example format of a "enumerate sections of absolute object response" instruction that is sent in response to the enumerate sections of absolute object instruction.

TABLE 23

| Opcode | 0x8000000B |
|---|---|
| Operand 1 | 0x00000000 for Success; 0x00000001 for Error |
| Payload | Array of section_GUIDs |

The request absolute object response instruction is sent by, for example, processor 106 to processor 108 with an operand to indicate success or failure in retrieving the list of sections. The payload field includes the requested list of sections if processor 106 is successful in retrieving from memory 110 the requested list of sections.

Table 24 below shows an example format of an "enumerate attributes of absolute section" instruction according to an embodiment of the invention.

TABLE 24

| Opcode | 0x0000000C |
| --- | --- |
| Operand 1 | Object GUID part 3 |
| Operand 2 | Object GUID part 2 |
| Operand 3 | Object GUID part 1 |
| Operand 4 | Object GUID part 0 |
| Operand 5 | Section GUID part 3 |
| Operand 6 | Section GUID part 2 |
| Operand 7 | Section GUID part 1 |
| Operand 8 | Section GUID part 0 |
| Payload | N/A |

According to an embodiment of the invention, the enumerate attributes of absolute section instruction causes a processor to retrieve a list of all sections of an object specified by the object_IDs in operands 1-4. For example, processor 108 may send a enumerate sections of absolute object instruction to processor 106 causing processor 106 to retrieve a list of sections of the object from memory 110 as specified by the object_IDs in operands 1-4. The list may be a list of section_GUIDs in an array.

Table 25 below shows an example format of an "enumerate attributes of absolute section response" instruction that is sent in response to the enumerate attributes of absolute section instruction.

TABLE 25

| Opcode | 0x8000000C |
| --- | --- |
| Operand 1 | 0x00000000 for Success; 0x00000001 for Error |
| Payload | Array of attribute_GUIDs |

The enumerate attributes of absolute section response instruction is sent by, for example, processor 106 to processor 108 with an operand to indicate success or failure in retrieving the list of attributes. The payload field includes the requested list of attributes if processor 106 is successful in retrieving from memory 110 the requested list of attributes.

5j. Retrieving Metabase

Table 26 below shows an example format of an "request metabase" instruction according to an embodiment of the invention.

TABLE 26

| Opcode | 0x0000000D |
| --- | --- |
| Operand 1 | 1 = XML; 2 = spreadsheet; 3 = ascii flat file |
| Payload | N/A |

According to an embodiment of the invention, the request metabase instruction causes a processor to retrieve a metabase 400 in a file format specified by operands 1. The file formats include but are not limited to XML, spreadsheet and ASCII flat file. For example, processor 108 may send a request metabase instruction to processor 106 causing processor 106 to retrieve a metabase 400 of all objects, sections within each object and attributes within each section from memory 110 in a format as specified by operands 1.

Table 27 below shows an example format of an "enumerate attributes of absolute section response" instruction that is sent in response to the enumerate attributes of absolute section instruction.

TABLE 27

| Opcode | 0x8000000D |
| --- | --- |
| Operand 1 | 0x00000000 for Success; 0x00000001 for Error |
| Payload | Metabase in requested format |

The request metabase response instruction is sent by, for example, processor 106 to processor 108 with an operand to indicate success or failure in retrieving the metabase. The payload field includes the metabase 400 if processor 106 is successful in retrieving from metabase 400 from memory 110.

It is to be appreciated that the embodiments presented herein may be implemented in any existing or future protocol besides MTP including but not limited to Picture Transfer Protocol (PTP), HTTP (Hyper Text Transfer Protocol), POP3 (Post Office Protocol 3), SMTP (Simple Mail Transfer Protocol), FTP (File Transfer Protocol), IP (Internet Protocol), DHCP (Dynamic Host Configuration Protocol), IMAP (Internet Message Access Protocol), ISDN Integrated Services Digital Network, PDH Plesiochronous Digital Hierarchy, T-carrier (T1, T3, etc.), E-carrier (E1, E3, etc.), RS-232, a serial line interface originally developed to connect modems and computer terminals, SDH Synchronous Digital Hierarchy, SONET Synchronous Optical NETworking, Layer 2 protocols (Data link layer), ARCnet, CDP Cisco Discovery Protocol, DCAP Data Link Switching Client Access Protocol, Econet, Ethernet, FDDI Fiber Distributed Data Interface, Frame Relay, HDLC High Level Data Link Control, LocalTalk, L2F Layer 2 Forwarding Protocol, L2TP Layer 2 Tunneling Protocol, LAPD Link Access Procedures on the D channel, LLDP Link Layer Discovery Protocol, LLDP-MED Link Layer Discovery Protocol—Media Endpoint Discovery, PPP Point-to-Point Protocol, PPTP Point-to-Point Tunneling Protocol, SLIP Serial Line Internet Protocol, Layer 4 protocols (Transport layer), IL Originally developed as transport layer for 9P, RTP Real-time Transport Protocol, SPX Sequenced Packet Exchange, SCTP Stream Control Transmission Protocol, TCP Transmission Control Protocol, UDP User Datagram Protocol, Sinec H1 for telecontrol, Layer 5 protocols (Session layer), 9P Distributed file system protocol developed originally as part of Plan 9, NCP NetWare Core Protocol, NFS Network File System, SMB Server Message Block (aka CIFS Common Internet FileSystem), Layer 7 protocols (Application layer), AFP pple Filing Protocol, BACnet Building Automation and Control Network protocol, BitTorrent, a peer-to-peer file sharing protocol, BOOTP Bootstrap Protocol, DIAMETER, an authentication, authorization and accounting protocol, DICT Dictionary protocol, DNS Domain Name Service, DHCP Dynamic Host Configuration Protocol, FTP File Transfer Protocol, Finger which gives user profile information, Gnutella—a peer-to-peer file-swapping protocol, Gopher, a precursor of web search engines, HTTP HyperText Transfer Protocol, used in the World Wide Web, SMTP Simple Mail Transfer Protocol, SNMP Simple Network Management Protocol and SOAP Simple Object Access Protocol.

6. EXAMPLE GENERAL PURPOSE COMPUTER SYSTEM

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In fact, in one embodiment, the invention is directed toward one or more computer systems capable of carrying out the functionality described herein. An example of a computer system 500 is shown in FIG. 5. In an embodiment, initiator 102 and/or responder 104 may include computer system 500 or portions of computer system 500 and be configured to perform the steps in flowcharts described herein. For example, processor 108 of initiator 102 or processor 106 of responder 104 may be processor 504 of computer system 500, and be configured to execute instructions to perform the steps in flowcharts described herein.

Computer system 500 includes one or more processors, such as processor 504. Processor 504 is connected to a communication infrastructure 506 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from communication infrastructure 506 (or from a frame buffer not shown) for display on display unit 516.

Computer system 500 also includes a main memory 505, preferably random access memory (RAM), and may also include a secondary memory 510. Secondary memory 510 may include, for example, a hard disk drive 512 and/or a removable storage drive 514, representing a floppy disk drive, a magnetic tape drive, an optical disk drive, etc. Removable storage drive 514 reads from and/or writes to a removable storage unit 515 in a well known manner. Removable storage unit 515 represents a floppy disk, magnetic tape, optical disk, etc. which is read by and written to by removable storage drive 514. As will be appreciated, removable storage unit 515 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 515 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 515 and interfaces 520, which allow software and data to be transferred from removable storage unit 515 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 505 and/or secondary memory 510. Computer programs may also be received via communications interface 524. Such computer programs, when executed, enable computer system 500 to perform the features of the present invention, as discussed herein. In particular, the computer programs, when executed, enable processor 504 to perform the features of the present invention. Accordingly, such computer programs represent controllers of computer system 500.

In an embodiment where the invention is implemented using software, the software may be stored in a computer program product and loaded into computer system 500 using removable storage drive 514, hard drive 512 or communications interface 524. The control logic (software), when executed by processor 504, causes processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

7. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodi-

What is claimed is:

1. A method to create a Digital Rights Management (DRM) media object comprising a media file and an associated DRM license, for storage in a memory of a computational device, comprising:
   creating a media file section in the DRM media object, wherein the media file section is configured to store the media file;
   creating an encrypted license section configured to store at least one DRM license associated with the media file;
   creating a file header section configured to store a first data integrity code, a media file type, a unique identification, a size of the DRM media object and pointers to multiple sections of the DRM media object;
   creating an encrypted preferences section configured to store user preferences for utilizing the media file;
   creating an encrypted tracking section configured to store a media identification, a computational device identification, a usage history and a DRM history;
   creating an encrypted file trailer section configured to indicate termination of the DRM media object and store a second data integrity code and the size of the DRM media object;
   creating an encrypted webpage metadata section in the DRM media object, wherein the encrypted webpage metadata section is configured to store data that enables the computational device to display a web page with information on media stored within the DRM media object, and wherein the DRM media object encapsulates the media file section and the encrypted webpage metadata section as a single unified object; and
   storing the DRM media object that includes both the media file section and the encrypted webpage metadata section in the memory of the computational device.

2. The method of claim 1, further comprising adding metadata to the DRM media object.

3. The method of claim 1, wherein the unique identification identifies the DRM media object, each section within the DRM media object and each attribute within each section and allows a user to modify each attribute within each section of each DRM media object.

4. The method of claim 1, wherein the media file is one or more of an audio, video or data file.

5. The method of claim 1, wherein the user preferences are one or more of volume settings for the media file, audio equalizer settings for the media file, and contrast and brightness settings for the media file.

6. The method of claim 1, wherein the media identification includes one or more of: a date of media file creation, a media file creator, a purchasing transaction information receipt for a vendor and a purchaser, and a time and date when the media file was played.

7. The method of claim 1, wherein the computational device identification includes one or more of: an identification number for the computational device and an internet protocol address for the computational device.

8. The method of claim 1, wherein the DRM history includes data on a provider or the DRM license and conditions for expiry of the DRM license.

9. The method of claim 1, wherein the DRM media object is encrypted in one or more of an Advanced Encryption Standard (AES), Data Encryption Standard (DES), Secure Hash Algorithm 1 (SHA 1), Secure Hash Algorithm 2 (SHA 2), Elliptic Curve Cryptography (ECC), Message Digest 4 (MD4), Message Digest 5 (MD5), Rivest Cipher 4 (RC4) and Rivest Cipher 5 (RC5).

10. A system to create a Digital Rights Management (DRM) media object that includes both a media file and an associated DRM license, comprising:
   a memory;
   a processor coupled to the memory and configured to store instructions that when executed by the processor cause the processor to:
   create an encrypted license section configured to store at least one DRM license associated with the media file;
   create a file header section configured to store a first data integrity code, a media file type, a unique identification, a size of the DRM media object and pointers to multiple sections of the DRM media object;
   create an encrypted preferences section configured to store user preferences for utilizing the media file;
   create an encrypted tracking section configured to store a media identification, a computational device identification, a usage history and a DRM history;
   create an encrypted file trailer section configured to indicate termination of the DRM media object and store a second data integrity code and the size of the DRM media object;
   create a media file section in the DRM media object, wherein the media file section is configured to store the media file;
   create an encrypted webpage metadata section in the DRM media object, wherein the encrypted webpage metadata section is configured to store data that enables a computational device to display a web page with information on media stored within the DRM media object, and wherein the DRM media object encapsulates the media file section and the encrypted webpage metadata section as a single unified object; and
   store the DRM media object that includes both the media file section and the encrypted webpage metadata section in a memory of the computational device.

11. The system of claim 10, wherein the memory further includes instructions that cause the processor to add metadata to the DRM media object.

12. The system of claim 10, wherein the unique identification identifies the DRM media object, each section within the DRM media object and each attribute within each section and allows a user to modify each attribute within each section of each DRM media object.

13. The system of claim 10, wherein the media file is one or more of an audio, video or data file.

14. The system of claim 10, wherein the user preferences are one or more of: volume settings for the media file, audio equalizer settings for the media file, and contrast and brightness settings for the media file.

15. The system of claim 10, wherein the media identification includes one or more of: a date of media file creation, a media file creator, a purchasing transaction information receipt for a vendor and a purchaser, and a time and date when the media file was played.

16. The system of claim 10, wherein the computational device identification includes one or more of: an identification number for the computational device and an internet protocol address for the computational device.

17. The system of claim 10, wherein the DRM history includes data on a provider or the DRM license and conditions for expiry of the DRM license.

18. A method to create a Digital Rights Management (DRM) media object comprising a media file and an associated DRM license, for storage in a memory of a computational device, comprising:
- creating a media file section configured to store the media file;
- creating an encrypted license section configured to store a DRM license associated with the media file;
- creating a file header section configured to store a first data integrity code, a media file type, a unique identification, a size of the DRM media object and pointers to multiple sections of the DRM media object;
- creating an encrypted webpage metadata section configured to store data that enables the computational device to display a web page with information on media stored within the DRM media object;
- creating an encrypted preferences section configured to store user preferences for utilizing the media file;
- creating an encrypted tracking section configured to store a media identification, a computational device identification, a usage history and a DRM history;
- creating an encrypted file trailer section configured to indicate termination of the DRM media object and store a second data integrity code and a size of the DRM media object; and
- storing the DRM media object in the memory of the computational device.

* * * * *

UNITED STATES PATENT AND TRADEMARK OFFICE
CERTIFICATE OF CORRECTION

| | |
|---|---|
| PATENT NO. | : 8,832,467 B2 |
| APPLICATION NO. | : 12/121639 |
| DATED | : September 9, 2014 |
| INVENTOR(S) | : Scott Krig |

It is certified that error appears in the above-identified patent and that said Letters Patent is hereby corrected as shown below:

In the Claims

Column 21
In line 49, replace "of volume" with --of: volume--.

Signed and Sealed this
Third Day of February, 2015

Michelle K. Lee
*Deputy Director of the United States Patent and Trademark Office*